United States Patent [19]
Babcock et al.

[11] 4,241,819
[45] Dec. 30, 1980

[54] CLUTCH PRESSURE PLATE NOISE REDUCTION

[75] Inventors: Bryce W. Babcock, Saline; Mark P. Reynolds, Birmingham; Kulbir Saluja, Southfield, all of Mich.

[73] Assignee: Federal-Mogul Corporation, Detroit, Mich.

[21] Appl. No.: 948,931

[22] Filed: Oct. 5, 1978

Related U.S. Application Data

[62] Division of Ser. No. 710,508, Aug. 2, 1976, Pat. No. 4,126,216.

[51] Int. Cl.³ .............................................. F16D 13/50
[52] U.S. Cl. ................................ 192/70.27; 192/89 B
[58] Field of Search ................ 192/89 B, 30 V, 70.27, 192/70.28; 188/1 B

[56] References Cited

U.S. PATENT DOCUMENTS

| | | | |
|---|---|---|---|
| 2,183,001 | 12/1939 | Wolfram | 192/89 B X |
| 2,234,756 | 3/1941 | Geyer | 192/70.27 X |
| 2,885,047 | 5/1959 | Kehrl | 192/89 B X |
| 2,952,453 | 9/1960 | Haussermann | 192/89 B X |
| 3,129,597 | 4/1964 | Prior | 192/89 B X |
| 3,417,846 | 12/1968 | Cook | 192/89 B X |
| 3,570,638 | 3/1971 | Baker | 192/70.27 |

FOREIGN PATENT DOCUMENTS 1184415 3/1920 United Kingdom ................... 192/89 B
1368245 9/1974 United Kingdom ................... 192/89 B

*Primary Examiner*—Philip C. Kannan
*Attorney, Agent, or Firm*—Robert F. Hess; William G. Coon

[57] ABSTRACT

The pressure plate actuation fingers of a friction clutch are provided with means for noise attenuation by the application of acoustical materials, alteration of the mass of vibrating parts, or surface treatment of slipping parts either individually or collectively to prevent the generation of objectionable noise due to resonance and sympathetic vibrations that are initiated by the stick-slip phenomenon as the non-rotating clutch release bearing contacts the relatively rotating actuation fingers.

5 Claims, 16 Drawing Figures

CLUTCH PRESSURE PLATE NOISE REDUCTION

This is a division, of application Ser. No. 710,508, filed Aug. 2, 1976 now U.S. Pat. No. 4,126,216.

BACKGROUND OF THE INVENTION

The phenomenon of stick-slip for generating sound has been a part of the human experience for hundreds of years. When it is properly controlled the result is music as experienced when a musician draws a horse hair bow coated with rosin across a violin string. If, however, the musician presses too hard on the bow and reduces the velocity of traverse across the string, the result is a nerve jangling squawk. A fingernail drawn across a blackboard gives the same effect as does the pressure plate of a clutch at the moment when the non-rotating surface of the clutch throw-out bearing contacts the rotating release fingers of the clutch pressure plate. The fingers of the clutch pressure plate act as tuning forks, which, in conjunction with the spring steel pressure plate, act as a sounding board vibrating as does a cymbal. Together they make a dissonant combination of tones that cannot be ignored and are very objectional.

Prior art has treated the problem of noise in a clutch by introducing various devices in the form of resilient linings and torsional vibration dampeners in proximity with the clutch friction plates. Nowhere, however, has prior art addressed the problem of axial vibrations which originate with the clutch pressure-plate release fingers. This undoubtedly is due to the difficulty encountered in isolating vibration sources in an assembly as complex as an operating clutch. In the case of the present invention, the source of vibrations was discovered while rubbing the clutch release fingers with an alcohol saturated cloth to remove grease. A characteristic sound was produced that was immediately identified with the chirp that is produced when the non-rotating clutch throw-out bearing contacts the relatively rotating clutch release fingers. Armed with this information, attention was focused on possible methods of preventing resonance in the release fingers.

Two courses of action were considered. First, the elimination of the stick-slip condition that prompts the resonance and second, dampening or altering the vibrations induced by stick-slip so that they do not become objectionable. Elimination of stick-slip by treatment of contacting surfaces was given second priority because it was felt that any such treatment would have little permanency in the environment of an operating clutch due to the presence of wear and wear particles. It was reasoned that wear particles could indeed become the equivalent of rosin on a violin bow which enhances the generation of stick-slip.

SUMMARY OF THE INVENTION

This invention, therefore, is primarily directed toward arresting axial vibrations in the clutch release fingers of a clutch pressure plate by dampening out those objectionable audible vibrations and their harmonics which are resonant to that unit. This is accomplished by the addition in intimate contact with the clutch release fingers, a body which has no resonant frequency or harmonic thereof which will vibrate in sympathy with the resonant frequency or harmonics in the audible range of the clutch release fingers.

In theory, many configurations will satisfy this condition such as immersion of the fingers in a liquid, coating the fingers with an appropriate thickness of lead or some other acoustic material, or changing the mass of the fingers to a point where the resonant frequency is beyond the audible range. Practically, however, the condition is most easily attained by weaving an elastomeric o-ring circumferentially in and out between the adjacent radially extending fingers of the pressure plate. An obvious variation of this would be to mold a ring of elastomeric material or acoustical material as an integral part of the clutch release fingers. A metal garter spring or leaf spring in any of several variations could also be designed to replace the o-ring as long as the natural frequency of the substituted spring does not match the natural frequency or harmonics of the clutch pressure plate.

The novelty of the present invention lies principally with the discovery of the problem. Once that is accomplished, the solutions, which are many and varied, are simply applications of the different facets of the science of acoustics.

DETAILED DESCRIPTION OF THE PREFERRED EMBODIMENTS

Figure 1:
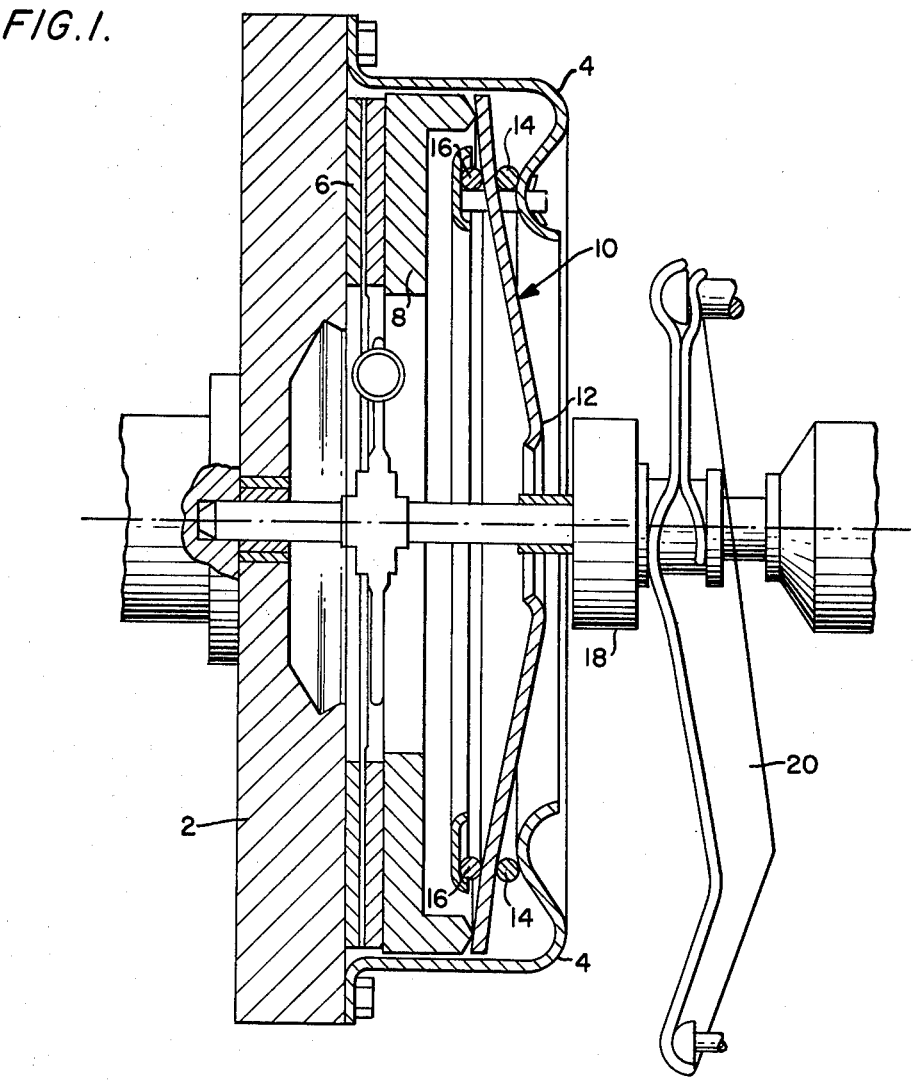
FIG. 1 shows in cross-section the main parts of a clutch of the pressure plate type.

FIG. 1 is a diagrammatic view in partial cross-section showing the general relationship of the main parts of a friction clutch of the pressure plate variety to which the present invention is directed. The largest structure of clutch assembly is the flywheel 2, driven by the engine, to which a pressed steel cover 4, is attached. The friction disc 6, is squeezed against the rear axial surface of the flywheel 2, by the pressure plate 8. Pressure for the squeeze is provided by the clutch spring 10 which is a conically shaped spring steel plate provided with radially inwardly extending clutch release fingers 12, at its inner periphery. The squeeze pressure is generated by flattening the cone spring and reacting it against a fulcrum 14, which is held in position by the cover 4. Pressure applied to the clutch release fingers 12 by the clutch throwout bearing 18, when moved by the actuation fork 20, flattens the cone by reaction about the fulcrum 16. As the cone flattens, the outer perimeter of the clutch plate which is the base of the cone, moves in the opposite axial direction from the clutch throwout bearing motion, to release the squeezing action of the pressure plate 8, against the friction disc 6, and the flywheel 2. With the squeeze absent, the flywheel 2 and the friction plate 8 are free to rotate independently of the friction disc 6 which is splined directly to the input shaft of the transmission. This allows, for instance, the engine of a car to be running while the car is standing still. This has the same effect as a car with the engine running, the clutch engaged, and the transmission in neutral. In neither case will power be transmitted from the engine to the drive wheels or vice versa.

In such a drive train, the only time the clutch throwout bearing 18 rotates is when the actuation fork 20 pushes the non-rotating throw-out bearing 18 against the rotating clutch release fingers 12 to disengage the clutch. The instantaneous slipping when stationary and rotating elements are brought into engagement causes the release fingers 12, which are made of spring steel, to vibrate at their resonant frequency as does a tuning fork when stroked by a violin bow. The second that results from these vibrations is amplified by the sheer number of the release fingers 12 vibrating at the same frequency and by sympathetic vibrations in the spring 10 and associated parts of the clutch assembly.

In the present invention, once the problem has been identified, there are at least three general solutions all of which are prior art in the science of acoustics. First, the vibrations may be dampened by application of acoustical material at strategic points. Second, surface treatment may be applied to the rubbing surfaces that initiate the stick-slip that causes the problem. Third, the resonating parts can be designed so that interfering resonances cancel each other out or the resonances are of such a high or low frequency that they are out of the audible range.

Figure 2:
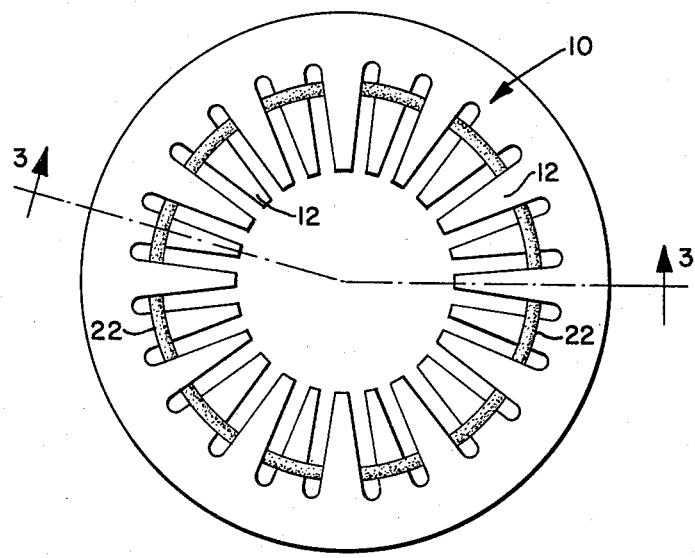
FIG. 2 shows a plan view of a clutch pressure plate with one embodiment of the invention.
Figure 3:
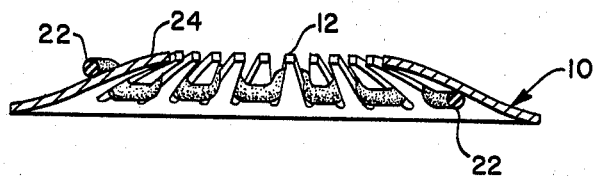
FIG. 3 is a cross-section of FIG. 2 taken along the lines 3—3.

Examples of the first solution are depicted in FIGS. 2-10. FIGS. 2 and 3 show the details of an acoustical ring such as an elastomeric o-ring 22 being circumferentially wound among the radially inward extending clutch release fingers 12 of the clutch spring 10. The o-ring 22 is of a size large enough to fit well outward radially in the interstices between the fingers 12 so that there is no contact with the clutch throw-out bearing 18 (see FIG. 1) where it contacts the clutch release fingers 12 at their convex surfaces 24. This simple and effective installation requires no adhesive or bonding procedure because the o-ring 22 is held in place by centrifugal force as the pressure plate 12 rotates with the engine. The weaving can take place at every second finger 12 as long as each finger 12 is brought into intimate contact on at least one circumferential side with the acoustical o-ring 22.

The interweaving feature of the elastomeric o-ring 22 in the present invention, muffles the vibration of the clutch release fingers 12 by at least two different mechanisms. First, the elastomeric ring 22 urges the adjacent fingers 12 out of phase with each other by pushing in one direction on one finger 12 while it pushes in the other direction at the same instant on the fingers 12 on either side of the first finger 12. The circumstance of being out of phase produces interference between outgoing sound waves which in itself is attenuating and also the opposition to motion reduces the amplitude or loudness of the waves.

Secondly, the impingement of the resilient elastomeric ring 22 against the hardened-steel resilient fingers 12, which are being urged to vibrate by the stick-slip mechanism of the interaction between the relatively moving bodies, tends to continually change the effective mass of the clutch release fingers 12. The more the o-ring is stretched, the greater becomes the apparent mass of the release finger doing the stretching.

It should be noted at this point that the mass in a given system is inversely proportional to the resonant frequency, id est, the larger the bell, the lower the tone. In the present invention, the apparent continuous change in mass results in a continuously changing resonant frequency so that true resonance is not attained for any frequency before the resonant frequency is changed to some other value. In other words, the energy which causes the initial vibration is absorbed or dissipated in continually changing the acceleration of the resonancy to the continuously changing accelerations of continuously differing frequencies. As taught in "The Calculus", this changing of a change is known as the second derivative of the fundamental velocity. These two factors of bringing out of phase and energy dissipation are effective in damping out objectionable vibrations.

Figure 4:
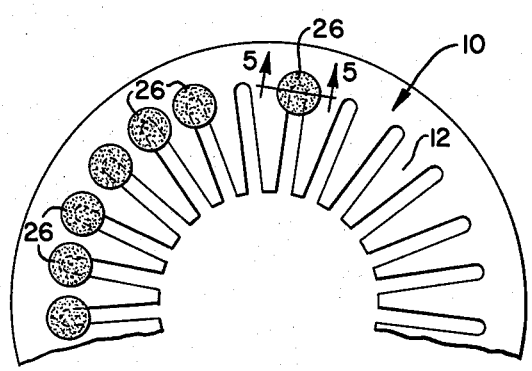
FIG. 4 is a partial plan view of another embodiment of the invention.
Figure 5:
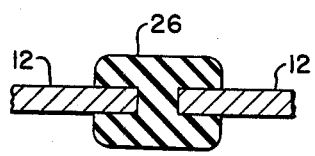
FIG. 5 is a cross-section of FIG. 4 taken along the lines 5—5.

FIG. 4 shows an elastomeric grommet 26 inserted in the interstices between the clutch release fingers 12 of the clutch spring 10. The assembly of this configuration is shown in cross-section in FIG. 5. Best results are obtained when the grommet 26 is a squeeze fit axially as well as circumferentially on the clutch spring 10 and the release fingers 12. Damping of the vibrations is achieved in much the same manner as squeezing a vibrating cymbal between a person's fingers.

Figure 6:
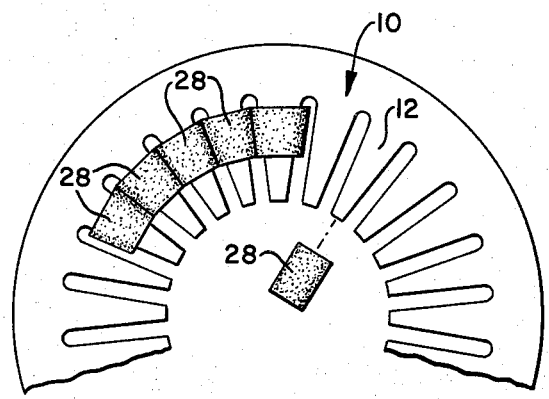
FIG. 6 is a partial plan view of still another embodiment of the invention.

FIG. 6 shows elastomeric tubes 28 inserted over the clutch release fingers 12 of the clutch spring 10. The elastomeric tubes 28 are stretched over the fingers 12 and are preferably short enough so that they do not cover the area 24 shown in FIG. 3 which contacts the clutch throw-out bearing 18 shown in FIG. 1. If tubes 28 are used which have radial walls that are thicker than the interstices between the release fingers 12, one tube over every third finger 12 is adequate to come into intimate contact with every finger 12 and effectively dampen the objectional vibrations.

Figure 7:
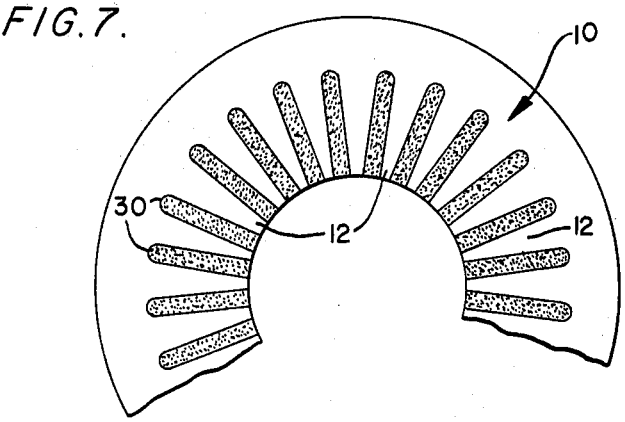
FIG. 7 is a partial plan view of still another embodiment of the invention.
Figure 8:
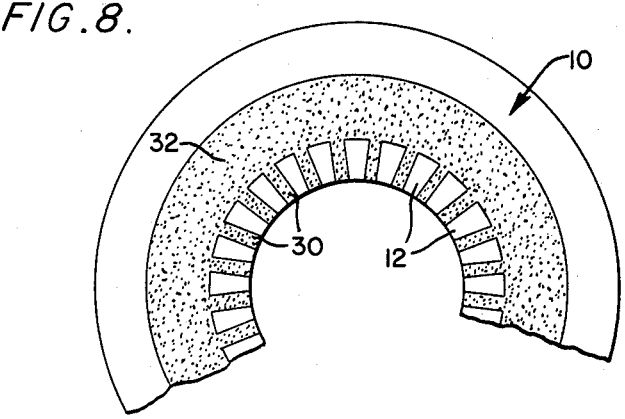
FIG. 8 is a partial plan view of still another embodiment of the invention.
Figure 9:
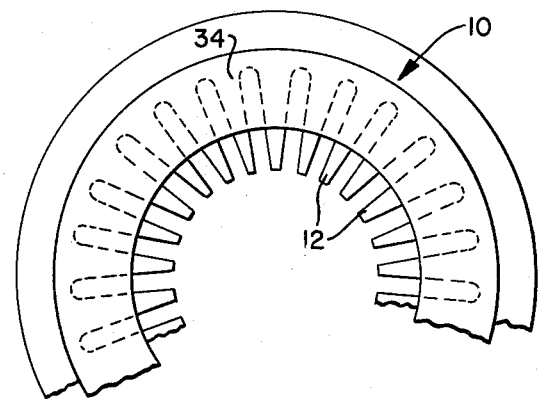
FIG. 9 is a partial plan view of still another embodiment of the invention.

FIGS. 7, 8, and 9 show several other versions of acoustical materials which have been applied to the clutch spring 10. In FIG. 7 the acoustical material 30 is an elastomer which has been molded in the interstices between the clutch release fingers 12 and bonded to the circumferential surfaces of the fingers 12. FIG. 8 shows the elastomer 30 as in FIG. 7 which has been connected by a circumferential web 32 of elastomer that has been bonded to the axial surfaces of the clutch spring 10 and the clutch release fingers 12. The web 32 may be on either or both axial surfaces and in addition to the dampening characteristics is an aid to the molding process. FIG. 9 shows the acoustical material as an annulus of adhesive tape 34 applied to an axial surface or surfaces of the clutch spring 10 and the clutch release fingers 12. In all cases the surface 24 shown in FIG. 3, where clutch release fingers 12 are contacted by the throw-out bearing 18 shown in FIG. 1, has been left free of acoustical material.

Figure 10:
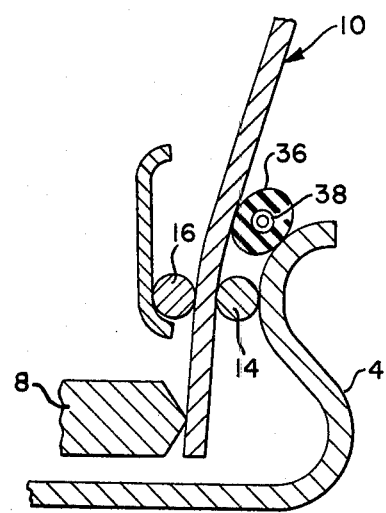
FIG. 10 is an enlarged view in cross-section of the area of the pivot points of the clutch pressure plate.

FIG. 10 is an enlarged cross-section of the clutch assembly at the pivot points 14 and 16 of the clutch spring 10. In this embodiment the acoustical element 36 is held in intimate contact with both clutch spring 10 and the clutch cover 4. Preferably the acoustical element which is made from some easily flexible material such as rubber is positioned radially inward from the fulcrums 14 and 16 so that it is in closer proximity to or impinging on the clutch release fingers. The acoustical element 36 may be a complete o-ring or it may be an interrupted circle with a spring core 38 to urge the acoustical element radially outward for more intimate contact with the clutch spring 10 and the clutch cover 4. Position of the acoustical element 36 may also be secured by molding and bonding it in place or by the application of an adhesive.

Figure 11:
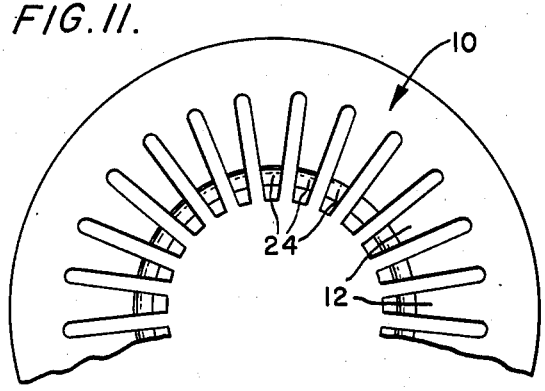
FIG. 11 is a partial plan view of still another embodiment of the invention.

FIG. 11 shows in plan view the convex surface 24 of the clutch release fingers 12 of the clutch spring 10 where contact is made with the clutch throw-out bearing 18 shown in FIG. 1. Stick-slip which initiates or excites resonance may be prevented if the contact surface 24 is polished to a surface finish of less than 15 micro-inches R.M.S. Stick-slip may also be prevented if the contact surface 24 is lubricated or coated with some substance with a low coefficient of friction such as polytetrafluorethylene. When stick-slip is eliminated from the initial contact between clutch release fingers 12 and throw-out bearing 18, it is unnecessary to apply damping materials to the clutch assembly because there will be no resonance to dampen. The application of damping materials under these conditions would be valuable only as a back-up measure as the contacting surfaces 24 degenerated from use.

Figure 12:
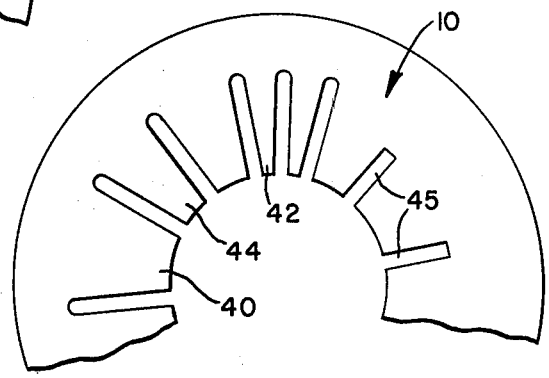
FIG. 12 is a partial plan view of still another embodiment of the invention.

FIG. 12 shows the plan view of a clutch spring 10 in which the circumferential widths of the clutch release fingers differ from each other so that each finger has a different excitation frequency. A wide clutch release finger 40 has a lower resonant or excitation frequency than does a narrow clutch release finger 42. Within this range are intermediate width fingers 44. In such a configuration, the resonant frequency of each clutch release finger is different from the resonant frequency of all the other clutch release finger so that no sympathetic vibrations exist. The vibrations, therefore, are spread out over a wide range with no frequency being dominant or reaching an objectionable level. Each finger resonates in accordance with its own mass. Mass may also be varied by altering the lengths of the interstices 45 between individual fingers 12.

Figure 13A:
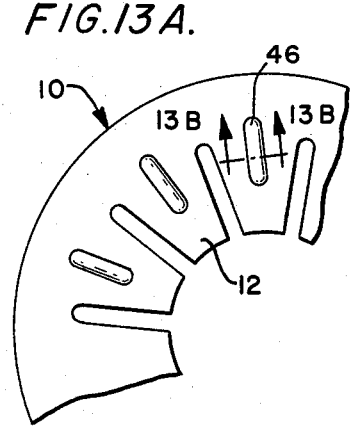
FIG. 13A & 13B is a partial plan view and cross-section of still another embodiment of the invention.
Figure 13B:
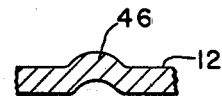

FIG. 13A and FIG. 13B show clutch release fingers 12 of a clutch spring 10 that have been stiffened along their radial axes by uninterrupted radial grooves 46. These radial grooves or ribs 46 as shown in enlarged radial cross-section in FIG. 13B have the effect of increasing the modulus of elasticity of each clutch release finger 12 so that the resonant frequency of each finger 12 can be increased to the point where the resulting sound is not objectionable because it is above the audible range. Comparable ribs and corregations are well known in such applications as automotive engine hoods and sheet metal roofing. In either case the function is primarily to increase rigidity of the structure.

Figure 14A:
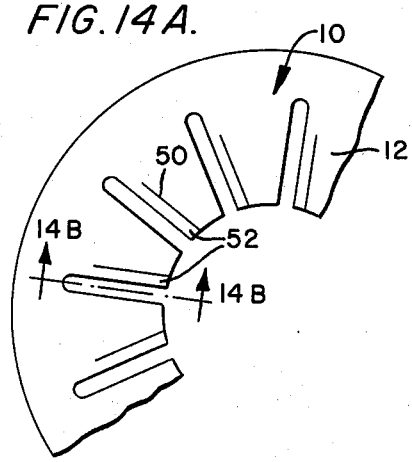
FIG. 14A & 14B is a partial plan view and cross-section of still another embodiment of the invention.
Figure 14B:
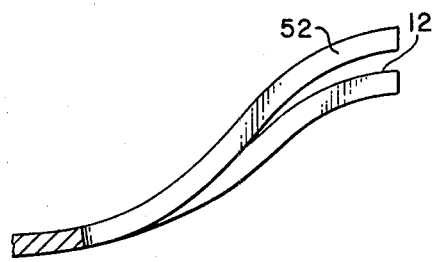

FIG. 14A and FIG. 14B show still another embodiment of the invention in which each clutch release finger 12 is provided with a radial slit along one edge to form a smaller secondary finger 52 which has been displaced axially, in the direction toward the clutch throw-out bearing, to a greater distance than the primary clutch release finger 12 as shown in circumferential cross-section in FIG. 14B. These secondary fingers 52, because of their decreased masses, have resonant frequencies that are not harmonics of the resonant frequency of the primary fingers 12 and are above the audible range. The secondary fingers 52, because of their increased axial displacement are also the first part of the spring 10 to contact the throw-out bearing 18 shown in FIG. 1. This initial contact of secondary fingers 52, is enough to rotate the throw-out bearing 18 so that when the throw-out bearing and the primary release finger 12 establish contact, they are traveling at the same circumferential speed at their points of contact and there is no stick-slip to initiate objectionable resonance in the audible range.

To those skilled in the art to which this invention relates, many changes in construction and widely differing embodiments and applications of the invention will suggest themselves without departing from the spirit and scope of the invention. The disclosures and the description herein are purely illustrative are not intended to be in any sense limiting.

We claim:

1. A clutch assembly including a flywheel, a pressure plate normally engaged to rotate with the flywheel and axially disengageable in relation therewith, a friction disc interposed between the flywheel and the pressure plate, and a clutch spring operatively associated with the pressure plate whereby upon exertion of an actuation force to the clutch spring, the pressure plate will cause the interposing friction disc to be disengaged from the flywheel, wherein said clutch spring is of a generally frustoconical shaped disc having a centrally located bore adapted to surround a shaft upon which is fixed said friction disc, said clutch spring being of spring steel and slotted beginning at the periphery of said bore and extending radially outwardly to a point intermediate the periphery of said bore and the outer periphery of said frustoconical shaped disc so as to form therebetween a plurality of inwardly extending integral clutch spring fingers, each said clutch spring finger having a free end toward the axis of rotation of said pressure plate and a surface at said free end adapted to receive the actuation force, said assembly including means for modifying the natural frequencies of a majority of said clutch spring fingers to reduce resonant vibrations within the audible frequency range during actuation of the clutch whereby audible resonant vibrations caused in said clutch spring fingers as a result of the free end of each such clutch spring finger coming into initial contact with and being in rotation with a clutch throw-out bearing, will be at least substantially eliminated.

2. A clutch assembly as described in claim 1 wherein said means for modifying is a part of each said clutch release finger and includes means for preventing excitation of objectionable resonance in sympathy at frequencies and their harmonics of other said clutch release fingers.

3. A clutch assembly as described in claim 2 wherein said means for preventing objectionable resonance includes said clutch release fingers being of different masses.

4. A clutch assembly as described in claim 2 wherein said means for preventing objectionable resonance includes said clutch release fingers having increased rigidity.

5. A clutch assembly as described in claim 2 wherein said means for preventing objectionable resonance includes said clutch release fingers being slit to form secondary finger which are further axially displaced, to form portions with resonant frequencies above the audible range, for initial contact with said clutch throw-out bearing.

* * * * *